US005525201A

United States Patent [19]
Diaz-Arauzo et al.

[11] Patent Number: 5,525,201
[45] Date of Patent: *Jun. 11, 1996

[54] OXYALKYLATED PHENOL/FORMALDEHYDE RESIN FOR DESALTER APPLICATIONS IN THE REFINERY INDUSTRY

[75] Inventors: Hernando Diaz-Arauzo, Houston; Paul M. Lindemuth, Sugar Land; Bryan T. O'Reilly, Round Rock, all of Tex.

[73] Assignee: Nalco Chemical Company, Naperville, Ill.

[*] Notice: The term of this patent shall not extend beyond the expiration date of Pat. No. 5,460,750.

[21] Appl. No.: 199,925

[22] Filed: Feb. 22, 1994

Related U.S. Application Data

[63] Continuation-in-part of Ser. No. 105,025, Aug. 10, 1993, Pat. No. 5,460,750.

[51] Int. Cl.⁶ .......................... B01D 17/05; C10G 33/02; C10G 33/04
[52] U.S. Cl. .................. 204/573; 208/251 R; 210/708; 252/331; 252/342; 252/358
[58] Field of Search .................. 252/331, 342, 252/358; 208/251 R; 210/708; 204/573, 181.9

[56] References Cited

U.S. PATENT DOCUMENTS

| | | | |
|---|---|---|---|
| 2,446,040 | 7/1948 | Blair, Jr. .................. | 252/327 |
| 2,524,889 | 10/1950 | DeGroote et al. ........... | 252/331 |
| 2,524,890 | 10/1950 | De Groote et al. .......... | 252/331 |
| 2,524,891 | 10/1950 | De Groote et al. .......... | 252/331 |
| 2,524,892 | 10/1950 | De Groote et al. .......... | 252/331 |
| 2,758,986 | 8/1956 | Mecum ................... | 528/101 |
| 2,971,923 | 2/1961 | Walker et al. ............. | 252/342 |
| 3,449,243 | 6/1969 | Strong, Jr. et al. ......... | 208/251 R |
| 4,722,781 | 2/1988 | Swartz et al. ............. | 210/708 X |
| 5,460,750 | 10/1995 | Diaz-Arauzo .............. | 252/331 |

*Primary Examiner*—Richard D. Lovering
*Attorney, Agent, or Firm*—Robert A. Miller; James J. Drake

[57] ABSTRACT

Certain base catalyzed oxyalkylated-cardanol-alkylphenol-aldehyde resins may be utilized in refinery demulsification operations. These materials find particular utility in breaking water-in-oil emulsions resulting from the water wash of crude oils. The materials may also be employed to break other water-in-oil refinery emulsions.

4 Claims, No Drawings

OXYALKYLATED PHENOL/FORMALDEHYDE RESIN FOR DESALTER APPLICATIONS IN THE REFINERY INDUSTRY

This application is a continuation-in-part of application Ser. No. 08/105/025, filed Aug. 10, 1993, now U.S. Pat. No. 5,460,750.

BACKGROUND OF THE INVENTION

1. Field of the Invention

Water-in-Oil emulsions resulting from the water wash of crude oils are broken using an oxyalkylated cardanol-phenolic-aldehyde resin.

The desalting of crude oil is a process in which salt and clay or other suspended solids that are present in crude oil are removed. Salts and suspended solids occur in crude oil as a result of natural contamination in the ground or occur as the result of contamination during transport. Solids and salts present in the crude oil must be removed prior to distillation since salt present in the oil may hydrolyze during processing giving HCl which can cause severe corrosion of equipment or which may lead to the plugging of process equipment due to the formation of insoluble salts. Salts and solids remaining in the distillation bottoms may cause problems in storage or during combustion of residual fuel oil. Salts and solids are removed from crude oil by washing it with water. This invention is directed to a method for resolving emulsions formed from the washing of crude oils using certain oxyalkylated cardanol-phenolic-aldehyde resins. Solids and salts settle from the wash water and tend to form emulsions which are often difficult to break especially from so called heavy crudes. The wash water is typically separated with heat, electrostatic precipitation, and various chemical additives.

It is an object of this invention to provide a superior chemical treatment for the resolution of emulsions formed as a result of washing crude oils with water.

It is a further object of the invention to provide a process for the resolution of water-in-oil emulsions formed from the water wash of crude oils using as chemical additives, certain oxyalkylated-cardanol-alkylphenol-aldehyde resins. Further additional objects will become apparent as my invention is described below.

2. Summary of the Invention

We have discovered that certain phenolic resins prepared by the base catalyzed condensation of cardanol, a para-alkyl phenol, and an aldehyde are superior chemical additives in resolving emulsions formed from the water washing of crude oils. The particular resins employed are described in copending application Ser. No. 08/105,025, filing date Aug. 10, 1993 which is hereinafter incorporated by reference into this specification.

The oxyalkylated-phenol-formaldehyde resins which are useful in the practice of this invention are those prepared by the base catalyzed condensation of cardanol, a para-alkyl phenol, and an aldehyde followed by reaction with an alkylene oxide or mixture thereof. An explanation of the synthesis, properties, and use of such resins can be found in the work of DeGroote et al. See, U.S. Pat. Nos. 2,524,890; 2,524,891; and 2,524,892 all of which are hereinafter incorporated by reference. DeGroote teaches the use as an oil emulsion breaker of ethoxylated derivatives of phenolic resins made by the condensation of formaldehyde, cardanol (a meta-substituted phenol derived from the shells of cashew nuts); and various ortho- and para-substituted phenols. This condensation may be either acid or base catalyzed, producing resins having at least 3 and up to 7 phenolic units whose molecular weight increases by subjecting the reaction to vacuum distillation and heating conditions. DeGroote reports preparation of phenolic resins having up to 20 phenolic units, but expresses a preference and claims for emulsion breaking purposes resins having fewer than seven phenolic groups per molecule, prepared in an acid catalyzed condensation.

As noted by DeGroote, emulsion breakers for crude oil can be introduced at various points along the chain of oil production. Typically, demulsification is conducted via heater treater vessels in which the oil is separated in the presence of heat and emulsion breaker. While the subject invention is directed to emulsion breaking, it is not directed to the demulsification of crude oil, but emulsions resulting from the water wash of crude oils to remove salts and solids from crude oil. Emulsions of this type typically contain small amounts of water (5%) as compared to naturally occurring crude oil emulsions.

Various derivatives of phenolic resins have found use as emulsion breakers. Most commonly, the resins are oxyalkylated to increase their molecular weight and modify their solubility or hydrophilic/lipophilic balance.

What I believe is not known in the art, for which I seek protection and exclusivity by this Letters Patent, is the use of certain oxyalkylated cardanol-alkylphenol-aldehyde resins (and their derivatives) having a high molecular weight (8,000–40,000) and phenolic moieties (40–100) as additives for the demulsification of water-in-oil emulsions formed from the water wash used in desalter units to remove soluble salts, suspended solids and the like from crude oil.

This invention begins with the preparation of a novel series of phenolic resins by the base catalyzed condensation of cardanol, a para-alkyl phenol, and an aldehyde. These compounds and their synthesis is described in commonly assigned pending application, Ser. No. 08/105,025 filed Aug. 10, 1993 which is hereinafter incorporated by reference. Superior results have been obtained with the hydroxide catalyzed condensation of cardanol, p-nonylphenol, and formaldehyde. By such processes, I have prepared phenolic resins having a higher molecular weight with a branched structure and a greater number of phenolic units per molecule than those of the prior art.

As with the phenolic resins of the prior art, derivatives may be prepared from the phenolic resins of this invention. Thus, adducts have been prepared using ethylene oxide, propylene oxide, 1–2 butylene oxide, and mixed oxides wherein the oxide accounts for between 20 and 80 weight percent of the resulting adduct. The oxyalkylated base catalyzed cardanolic resins useful in the subject invention typically are condensed with 1 to 40 mole of alkylene oxide per mole of resin and preferably 1 to 30 moles of alkylene oxide per mole of resin. In a preferred embodiment of this invention, 1 to 20 moles of alkylene oxide are condensed per mole of resin.

Surfactants prepared from these high molecular weight oxyalkylated phenolic resins have been successfully employed to break emulsions formed as a result of the refinery desalting process for removing salt and suspended solids from crude oils. It is common practice in the breaking of water-in-oil emulsions of the type formed from the aqueous wash of crude oil to mix together various surfactants, often of different composition, to obtain a blend that exhibits superior demulsification properties when applied to desalting units using crude oils of various origins. Bottle testing using the novel desalting cardanolic oxyalkylate additives of this invention have shown better performance than those blends which lack the cardanolic resins of this invention.

DETAILED DESCRIPTION OF THE INVENTION

Preparation of the Phenolic Resins

This invention uses as one component of its phenolic resin a compound known as cardanol, which is derived from cashew nut shell liquid. As it occurs in nature, cashew nut shell liquid consists primarily of anacardic acid:

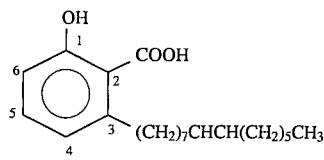

The name is derived from anacardium, the genus of the tree that produces the cashew nut. Anacardic acid is decarboxylated when heated in the presence of acid, giving the meta-substituted phenol, cardanol, which is used in this invention. The phenolic resins that are exemplified in this disclosure are the condensation products of cardanol, p-nonylphenol, and formaldehyde. However, as taught by DeGroote, phenolic resins may be prepared by the condensation of cardanol and a variety of para-substituted alkyl phenols. The examples of such phenols that have found use in the preparation of desalting additives include p-nonylphenol, p-amylphenol, and t-butylphenol. Resins prepared by combining these phenols (or any other para-substituted alkyl phenols) to yield resins having a high-molecular weight and a high number of phenol moieties are all within the scope of this invention, even if not specifically exemplified.

Similarly, while formaldehyde is the preferred aldehyde with which to condense with cardanol and p-alkylphenol, other aldehydes may be employed. This, too, is taught by DeGroote. Thus it is within the expertise of those skilled in the art to vary the aldehyde component of these novel resins, and this invention is not limited to the use of the specific resins exemplified in this disclosure which are all synthesized using formaldehyde as the aldehydic component.

EXAMPLE 1

High molecular weight phenol-aldehyde condensates useful in this invention may be prepared as follows, with the sample component quantities listed in Table 1.

TABLE 1

| | Weight (g) | | | |
|---|---|---|---|---|
| MATERIAL | A | B | C | D |
| Aromatic Solvent | 133.3 | 133.3 | 133.3 | 133.3 |
| p-Nonylphenol | 66.66 | 66.66 | 66.66 | 66.66 |
| Cardanol | 98.98 | 98.98 | 98.98 | 98.98 |
| p-Formaldehyde | 19 | 19 | 19 | 19 |
| KOH | 1.73 | 1.73 | 1.73 | 1.73 |
| Ethylene Oxide | 0 | 255.73 | 158.83 | 79.91 |
| Propylene Oxide | 255.73 | 0 | 0 | 0 |

Nonylphenol, cardanol, half of the high boiling aromatic solvent (such as Exxon Aromatics 150 Product), and potassium hydroxide are added to a reactor flask and stirred for 15 minutes. Para-formaldehyde is added gradually so that the solution temperature does not exceed 100° C. The reactor is then heated at 94°–98° C. for three hours. The reminder of the solvent is then added and the mixture is refluxed (at about 144° C.) for two additional hours.

The high molecular weight resins prepared above are preferably alkoxylated using standard bulk methods. Ethylene oxide and propylene oxide adducts of these resins have been prepared. The amount of ethylene oxide and/or propylene oxide condensed onto the starting resins are stated in Example 1. Generally, from 1 to 40 moles of alkylene oxide are condensed onto one mole of resin to produce the products necessary to practice the process of this invention. Preferably, from 1 to 30 moles of alkylene oxide are condensed onto one mole of the high molecular weight cardanol resin, and preferably, from 1 to 20 moles of alkylene oxide are condensed onto one mole of the high molecular weight cardanol resin. While ethylene oxide and propylene oxide are the preferred alkylene oxides for use in this invention, other alkylene oxides may be used. Most preferably, mixtures of ethylene oxide and propylene oxide are employed. It will be readily seen by those skilled in the art that specific ratios of ethylene oxide and/or propylene oxide may be tailored to produce desired hydrophilic/lypophilic balance to have the best performance in breaking the refinery emulsions that are the subject of this invention. Such experimentation is within the knowledge of those skilled in the art.

Although some crude oils require more hydrophilic character in the polymer backbone to show performance, the variations in crude oils are too wide to generally point out any specific direction or correlation that is generally applicable.

Procedures for condensing the resins with ethylene oxide and propylene oxides are well known to those skilled in the art. The materials listed in Table 1 were condensed with ethylene oxide and propylene oxide in the quantities shown in the table using the procedure set forth below:

1. The reactor is charged with the base catalyzed cardanol, nonyl phenol/formaldehyde resin (A, B, C, or D);

2. The reactor is purged with nitrogen at 100° C. for 15 minutes;

3. The reactor is pressurized to 51 psi. and heated to 120°–130° C.;

4. The ethylene oxide or propylene oxide is then charged;

5. The reactor is monitored by pressure reduction, from around 350 psi (after the oxide is charged) to 51 psi.

6. The mixture is cooled and recovered.

The viscosity of the resulting compositions is well within acceptable limits. For resins A and B, a Brookfield viscosity of 500 has been measured at room temperature using a number 2 spindle at 12 rpm. The molecular weights of the resulting resins can be measured using several different methods. One commonly accepted method measures the "relative molecular weight" using a gas chromatograph, by comparing the retention time of the polymer to that of a standard polymer of a known molecular weight. The relative molecular weights of the compositions prepared by the methods of Example 1 using the quantities of reactants specified, range from 23,000 to 60,000 g/mole.

In treating emulsions of the type formed with wash water (5%) and crude oil, generally from 1 to 100 ppm of the compositions of this, invention will be necessary to effectuate a satisfactory demulsification. Preferably from 1 to 50 ppm of the compositions of this invention are necessary, and most preferably, from 1 to 15 ppm of the compositions of this invention are necessary. Often emulsions formed from wash water and crude oil will have variable composition and effective dosages of the compositions of this inventions may be determined through appropriate experimentation utilizing the actual emulsion to be treated.

While emulsions of this type are often treated in electric desalter units where a voltage can be applied across the emulsion to help effectuate separation, the compositions of this invention may also be used to break water-in-oil emulsions of waste associated with gas oil hydrotreater, tankage dehydration, slop oil treatment applications used in refineries.

EXAMPLE 2

The resins of Example 1 were evaluated as emulsionbreakers for the Water-in-oil emulsions resulting from the water wash of crude oil. The crude blend employed contained in approximate percentages by weight: 58% Furrial, 33% Laguna/Lagomedio; 8.7% Pilon, all Venezuelan crude oils. The additives of this invention were tested using a portable electric desalter unit. Typically, an emulsion is prepared by shearing crude oil and wash water from a refinery to an undetermined droplet size that does not allow an untreated sample (blank) to destabilize appreciably during the test, but also allows sufficient differentiation among the chemicals being screened as wash water demulsifier additives. The test method employed the following steps:

1. Add crude oil and wash water to a variable speed blender in requisite amounts.

2, Shear to emulsify with a time/speed combination that will not permit an undosed (blank) sample to break during the test, but will allow for differentiation of desalter additives.

3, Fill centrifuge tubes to 75 ml fiducial mark with emulsion.

4. Dose tubes with requisite amount of chemical. Deliver desalter additive below surface of emulsion to prevent chemical from adhering to glass.

5. Shake tubes by hand 100 times to incorporate desalting additive into sample.

6. Place tubes into portable electric desalter at 180° F. for ten minutes and record ml's of water resolved at bottom of tube after the ten minute time period.

7. Fit tubes loosely with electrodes and induce a field of 3000 V for 1 minute.

8. Record total amount of water coalescence in ml's.

9. Repeat steps 7 and 8.

10. Record total ml's water coalesced after 20, 30 and 40 minutes elapsed time.

11. Convert ml's water coalescence to volume % of total water added and plot vs. elapsed time.

The desalting additives of this invention (A-D from Example 1) were tested against a series of commercially available desalting additives using the test method described above. Results of the testing of the samples of Example 1 are found in Table 2.

TABLE 2

| CHEMICAL | 15 MIN | 20 MIN | 30 MIN | 40 MIN |
|---|---|---|---|---|
| A | 18.7 | 29.3 | 40 | 45.3 |
| B | 0 | 0 | 0 | 4 |
| C | 2.7 | 2.7 | 2.7 | 4 |
| D | 2.7 | 2.7 | 8 | 37.3 |
| E | 0 | 0 | 2.7 | 2.7 |
| F | 0 | 8 | 13.3 | 16 |
| G | 0 | 0 | 0 | 0 |
| Blank | 0 | 0 | 0 | 0 |

Chemical E is Nalco L551M, available commercially from Nalco Chemical Company. This material is described as an ethoxylated acid catalyzed nonylphenol/formaldehyde resin.

Chemical F is Nalco 1230M, available commercially from Nalco Chemical Company. This material is described as an ethoxylated acid catalyzed nonylphenol/formaldehyde resin.

Chemical G is Nalco V20351M, available commercially from Nalco Chemical Company. It is described as an ethoxylated acid catalyzed nonylphenol/formaldehyde resin.

As seen from the above examples the oxyalkylated phenol formaldehyde resins of this invention provide superior wash water emulsion breaking ability to the refining industry.

Having thus described our invention, we claim:

1. A method for breaking a water-in-oil emulsion produced by the water washing of crude oil to remove salts and suspended solids contained in the oil which comprises adding to said wash water an effective amount of a surface active composition comprising: a phenolic resin comprising the base catalyzed condensation product of cardanol, an alkylphenol selected from the group consisting of p-nonylphenol, p-amylphenol and t-butylphenol and formaldehyde, said resin having a branched structure and an average molecular weight in the range of about 8,000 to about 40,000, said phenolic resin having been reacted with from 1 to 40 moles of an alkylene oxide per mole of resin.

2. The method of claim 1 wherein the phenolic resin is the base catalyzed condensation product of cardanol, p-nonyl phenol and formaldehyde reacted with from 1 to 40 moles of an alkylene oxide selected from the group consisting of ethylene oxide and propylene oxide and mixtures thereof per mole of resin.

3. The method of claim 2 wherein the phenolic resin is the base catalyzed condensation product of cardanol, p-nonyl phenol and formaldehdye reacted with from 1 to 30 moles of an alkylene oxide selected from the group consisting of ethylene oxide and propylene oxide and mixtures thereof per mole of resin.

4. The method of claim 2 wherein the wash water is treated in an electric desalting unit.

* * * * *